United States Patent [19]
Nemoto

[11] Patent Number: 4,858,739
[45] Date of Patent: Aug. 22, 1989

[54] CLUTCH AND BRAKE ASSEMBLY FOR WORKING VEHICLES

[75] Inventor: Shusuke Nemoto, Midorigaoka, Japan

[73] Assignee: Kanzaki Kokyukoki Mfg. Co., Ltd., Japan

[21] Appl. No.: 225,363

[22] Filed: Jul. 28, 1988

[30] Foreign Application Priority Data

Sep. 30, 1987 [JP] Japan .................. 62-149477

[51] Int. Cl.$^4$ .................................. F16D 13/22
[52] U.S. Cl. .................... 192/18 R; 192/13 R; 192/70.11; 192/70.3; 74/371; 180/6.2; 180/6.7
[58] Field of Search ............. 192/12 R, 13 R, 15, 192/18 R, 48.1, 48.8, 49, 70.11, 70.28, 70.3; 74/371, 372, 665 GA, 665 T; 180/6.2, 6.7

[56] References Cited

U.S. PATENT DOCUMENTS

| | | | |
|---|---|---|---|
| 2,205,989 | 6/1940 | Meyers et al. | 192/18 R |
| 2,494,739 | 1/1950 | Booth | 192/15 |
| 3,009,553 | 11/1961 | Henyon | 192/48.1 |
| 3,250,151 | 5/1966 | Binger | 180/6.7 |
| 3,386,545 | 6/1968 | Hansen | 192/18 R |
| 3,502,184 | 3/1970 | Pawlina et al. | 192/48.91 |
| 3,572,482 | 3/1971 | Kalpas | 192/15 |
| 3,638,772 | 2/1972 | Lewis et al. | 192/15 |
| 3,680,670 | 8/1972 | Hansen | 180/6.2 |
| 3,907,052 | 7/1975 | Shaw | 180/6.7 |
| 4,432,443 | 2/1984 | Sommer | 192/12 R |
| 4,673,055 | 6/1987 | Yamaoka et al. | 180/336 |

FOREIGN PATENT DOCUMENTS 60-23253 7/1985 Japan.

*Primary Examiner*—Leslie A. Braun
*Assistant Examiner*—Nicholas Whitelaw

[57] ABSTRACT

Left and right side clutches (15) and side brakes (18), each fashioned into a frictional disk type, are disposed between an axle-driving power output shaft (12) and left and right wheel axles (11). Axially spaced left and right side clutch gears (13) which carry, at boss portions thereof, left and right clutch housings (14) extending towards each other are rotatably mounted on the output shaft. The clutch of each side is disposed within each of the housing (14) and includes frictional elements (17) supported by the housing. The brake of each side is disposed within a space around each housing (14) and includes frictional element(s) (20) supported by the housing.

The clutch and brake of each side are operated by a single mechanism including a shifter sleeve (22), slidably mounted on the housing (14), and a pivotal clutch control arm (21) extending through a peripheral wall of the housing. The arm engages the sleeve which is biased to move towards the clutch-engaging and brake-disactuating direction by the clutch spring means (23).

The clutch and brake assembly is disposed in a compact fashion around the output shaft within the length of the shaft. The shifter sleeve and clutch spring means control both of the clutch and brake of each side.

4 Claims, 4 Drawing Sheets

CLUTCH AND BRAKE ASSEMBLY FOR WORKING VEHICLES

FIELD OF THE INVENTION

This invention relates to a clutch and brake assembly comprising a left side clutch and brake and a right side clutch and brake and used in vehicles such as self-propelled walking mowers, mower tractors, and transport vehicles.

BACKGROUND OF THE INVENTION

Frictional disk-type side clutches and brakes are well suited for steering a vehicle because the clutches and brakes do not require a large space and because one may easily operate the clutches and brakes by applying an operating force to them. Thus, these clutches and brakes easily turn the vehicle at a desired radius.

Such side clutches and side brakes are incorporated in a vehicle power transmission between an axle-driving power output shaft and left and right wheel axles. In the past, left and right clutch shafts for associating left and right side clutches and brakes have been provided separately from the axle-driving power output shaft.

That is, as shown in, for example, Japanese Utility Model Publication No. 60-23253, left and right clutch shafts are disposed coaxially with an axle-driving output shaft at opposite sides of the output shaft. To one and the other ends of the output shaft are fixedly secured left and right clutch housings which extend towards left and right clutch shafts, respectively. Each of the left and right side clutches is disposed within each of the left and right clutch housings and is fashioned into a frictional disk type having opposite sets of frictional elements which are slidably but non-rotatably supported respectively by each clutch housing and by each of the left and right clutch shafts. At the outer sides of such left and right side clutches are disposed left and right side brakes of a frictional disk type each of which is fashioned to have opposite sets of frictional elements supported respectively by a transmission casing, or alternatively by a separate brake casing, and by each clutch shaft.

The structure referred to above requires a lengthy transmission casing due to separate clutch shafts disposed at opposite sides of the output shaft and due to the side by side arrangement of respective side clutches and side brakes which arrangement requires prolonged clutch shafts.

For steering a vehicle, the clutch and brake at one side of a clutch and brake assembly are usually operated using a common operating mechanism so that first, the clutch is disengaged and then the brake is actuated. The clutch and brake at each side are spaced axially on each of the clutch shafts according to the prior art, and they necessarily require separate clutch-disengaging and brake-actuating mechanisms. Thus, a timing mechanism required for operating the clutch and brake in order must be included in the clutch/brake-operating mechanism. A clutch spring which is associated with each side clutch for keeping the clutch normally in its engaged state can not be used also as a return spring for preventing a spontaneous or unexpected actuation of each side brake, because a brake-actuating mechanism is provided separately from a clutch-disengaging mechanism. Consequently, both of the clutch spring and brake return spring are provided which will make clutch/brake-operation heavy.

OBJECT

Accordingly, a primary object of the present invention is to provide a novel clutch and brake assembly for vehicles in which left side and right side clutches and brakes are disposed around an axle-driving output shaft so as to largely shorten a transmission casing. The clutch and brake of each side are operated by a single clutch-disengaging and brake-actuating mechanism with which a single spring means is associated for normally engaging the clutch and for preventing a spontaneous actuation of the brake.

BRIEF DESCRIPTION OF THE DRAWINGS

Other objects and advantages of the invention will become readily apparent as the specification is considered in conjunction with the accompanying drawings, in which.

SUMMARY OF THE INVENTION

Figure 1:
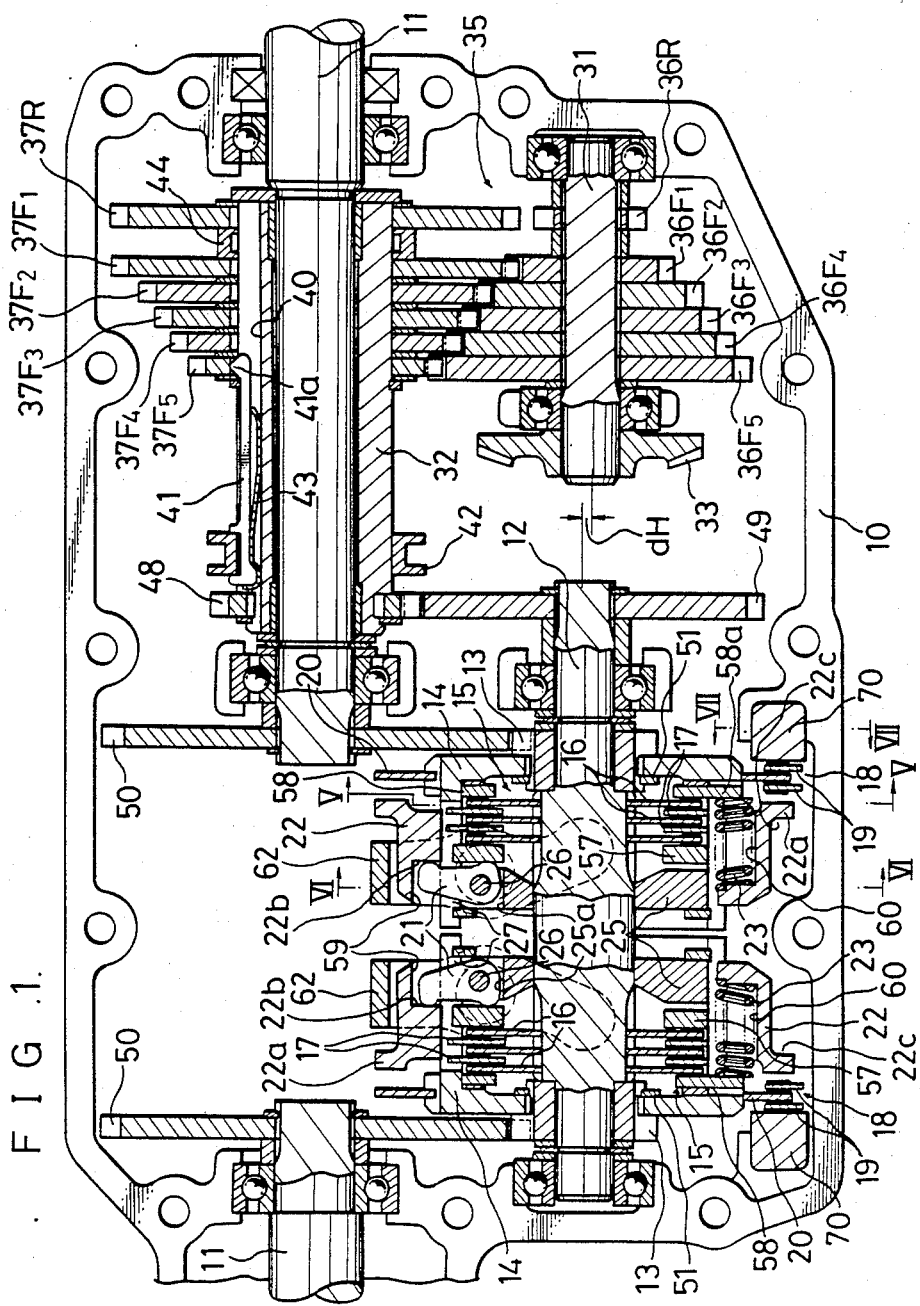
FIG. 1 is a sectional plane view of a transmission casing of a vehicle in which an embodiment of the clutch and brake assembly according to the present invention is employed.

As shown in FIG. 1, a transmission casing 10 for a vehicle supports, rotatably, left and right wheel axles 11 which extend sidewards from the casing 10. An output shaft 12 is journalled in the transmission casing shaft 12 for transmitting vehicle-driving power to the left and right wheel axles 11.

According to the present invention, axially spaced left and right side clutch gears 13 are rotatably mounted on the output shaft 12 for transmitting power from such output shaft to the left and right wheel axles 11. Left and right clutch housings 14 which extend towards each other are fixedly secured to boss portions of these side clutch gears 13.

Within these clutch housings 14 are disposed left and right side clutches 15 of a frictional disk type each having first and second frictional elements 16 and 17 which are slidably but non-rotatably supported respectively by the output shaft 12 and by each clutch housing 14. Within spaces around the left and right clutch housings 14 are disposed left and right side brakes 18 of a frictional disk type each having third and fourth frictional elements 19 and 20 which are slidably but non-rotatably supported respectively by the transmission casing 10 and by each clutch housing 14.

The clutch and brake assembly shown in FIG. 1 further comprises, according to the present invention left, and right clutch control arms 21, each of which extends through the peripheral wall of each clutch housing 14 and is supported pivotally by the housing 14 for engaging and disengaging each side clutch 15, and left and right shifter sleeves 22, each of which is slidably disposed on the outer circumference of each clutch housing 14 and includes axially spaced first and second pushing portions 22a and 22b.

The first pushing portion 22a of each shifter sleeve 22 is adapted to actuate each side brake 18 by a movement of the shifter sleeve 22 towards a first direction, whereas the second pushing portion 22b is adapted to rotate each clutch control arm 21 so as to engage each side clutch 15 by a movement of the shifter sleeve 22 towards a second direction. On the outer circumference of each clutch housing 14 is disposed a clutch spring means 23 which is adapted to bias each shifter sleeve 22 to move towards the second direction referred to above.

The clutch and brake assembly shown operates as follows:

Without an operating force applied to it, the shifter sleeve 22, is biased by the spring means 23 and its second pushing portion 22b pushes the clutch control arm 21. The arm 21 rotates to its clutch-engaging position; and thus, the side clutch 15 is kept in its engaged state under the biasing of clutch spring means 23. In this clutch-engaged condition, the first pushing portion 22a of the shifter sleeve lies at the most remote position from the side brake 18, so that the brake is kept in its unactuated state. Consequently, rotation of the output shaft 12 is transmitted through the side clutches 15 and clutch housings 14 to the side clutch gears 13 and then to wheel axles 11 of the corresponding sides. A spontaneous or unexpected actuation of each side brake 18 is prevented with certainty by the biasing of each shifter sleeve 22 which the spring means 23 produces.

To turn the vehicle, one of the shifter sleeves 22 located at the intended turning side is shifter on the clutch housing 14 towards side brake 18. As a result, the biasing force of the clutch spring means 23 applied to the clutch control arm 21 is reduced so that the side clutch 15 moves to a half engaged state where the frictional elements 16 and 17 are slippingly engaged. By a further shifting of the shifter sleeve 22, the first pushing portion 22a pushes the frictional elements 19 and 20 of side brake 18 so that the side brake moves to a half actuated state where the frictional elements 19 and 20 are slippingly engaged. The half engaged state of the side clutch 15 as well as the half actuated state of the side brake 18 may be varied by a control of the operating force applied to the shifter sleeve 22 so that turning radius of the vehicle may be varied.

The left and right side clutches 15 and side brakes 18 provided in the clutch and brake assembly according to the present invention are arranged within the length of axle-driving power output shaft 12 by utilizing left and right clutch housings 14 which are fixedly secured respectively to boss portions of axially spaced side clutch gears 13 on the output shaft 12 and which extend towards each other around the output shaft 12. Each of the clutch housings 14 is used for supporting not only one frictional element or set of elements 17 of each side clutch 15 but one frictional element or set of elements 20 of each side brake 18 which is disposed within a space around the clutch housing so as not to lengthen the clutch and brake assembly. It is thus seen that the clutch and brake assembly according to the present invention contributes to reduce largely the length of a transmission casing for a vehicle.

Each shifter sleeve 22 lies slidably disposed on the outer circumference of each clutch housing 14 and acts upon each side clutch 15 via the pivotal clutch control arm 21, extending through the peripheral wall of the clutch housing and applying the biasing force of the clutch spring means 23 to the side clutch. This shifter sleeve 22 also releases the side clutch 15 from the biasing force of the clutch spring means to disengage the clutch and then actuate each side brake 18. Thus, the clutch-disengaging mechanism and brake-actuating mechanism of each side are unified into a single mechanism having a common shifter element 22. The clutch spring means 23 associated with this unified mechanism also functions as a return spring for the side brake 18. Consequently, the structure of the clutch and brake assembly is simplified. The side clutch 15 and side brake 18 of each side are operated against the single spring means 23 so that a reduction in operating force is attained.

Figure 6:
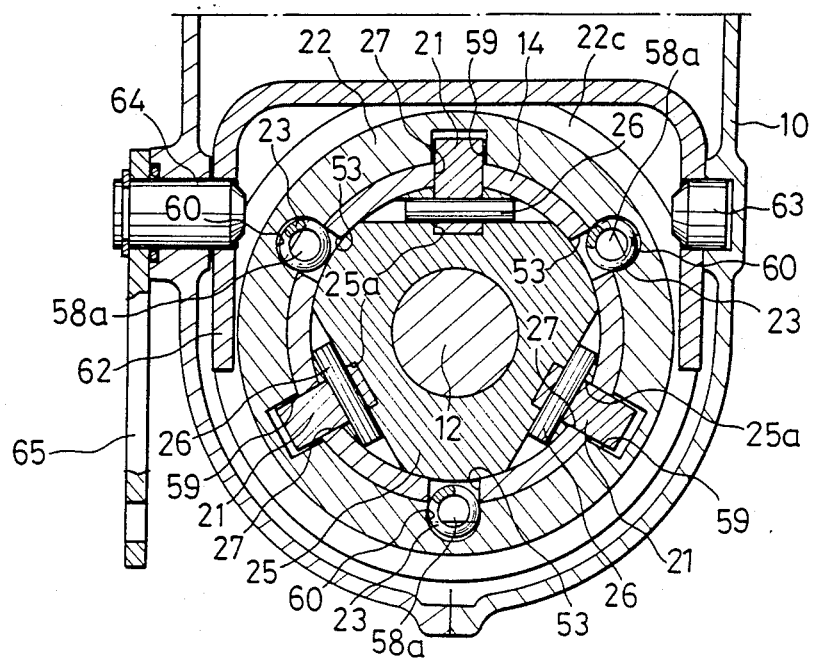
FIG. 6 is an enlarged sectional view taken generally along line VI—VI of FIG. 1.

According to the present invention, the clutch and brake assembly further includes a support ring 25 which is fittingly disposed in each of the clutch housings 14. As shown in FIGS. 1 and 6, this support ring 25 includes a recess 25a which has open ends directed towards each side clutch 15 and towards the inner circumference of the clutch housing 14. Each of the clutch control arms 21 is received at an inner end portion of the recess 25a and is pivotally connected to the support ring 25 using a pin 26. An outer end portion of the clutch arm 21 extends outwardly through an axially elongated thorough bore 27 in the peripheral wall of the clutch housing 14.

This structure, as compared to a stucture in which the clutch control arm 21 is pivotally supported directly by the clutch housing, enlarges the interval between the support point or fulcrum of the clutch control arm 21 and the point on this arm which the second pushing portion 22b of shifter sleeve 22 engages, while it reduces the interval between the support point or fulcrum of the clutch control arm 21 and the point at which the arm 21 pushes the side clutch 15 or the frictional elements 16 and 17. Consequently, an enlarged leverage is obtained for applying the biasing force of spring means 23 to side clutch 15; and a clutch spring means 23 which has a relatively small biasing force is satisfactory for obtaining the required engagement of the side clutch 15. Use of a lighter clutch spring further reduces the operating force to be applied to the shifter sleeve 22.

Preferably the support ring 25 is received by the output shaft 12, as shown in FIGS. 1 and 6, for a stable support of the clutch housing 14.

Figure 5:
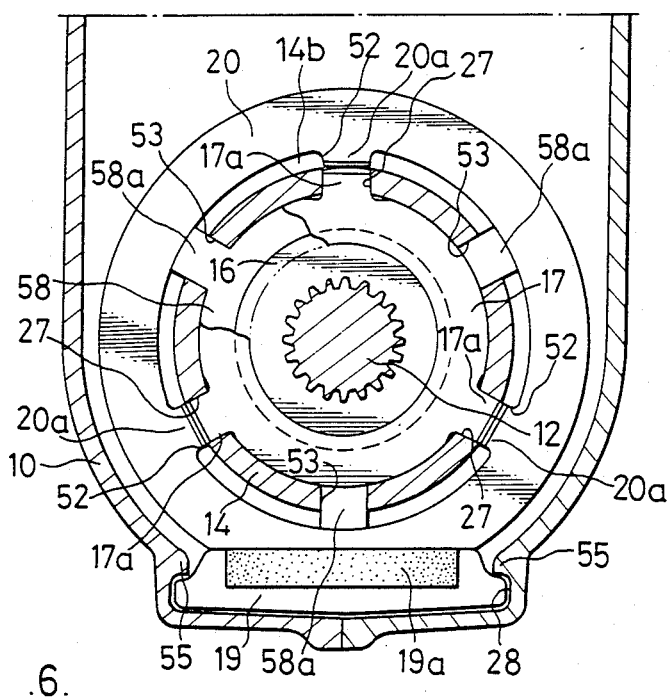
FIG. 5 is an enlarged sectional view taken generally along line V—V of FIG. 1.

In the side brake 18 disposed in a space around the clutch housing 14, the frictional element 20 supported by the clutch housing is ring-shaped and has a relatively large outer diameter. Consequently, a part of such element 20 already provides a relatively large surface area for a frictional engagement. From this, the clutch and brake assembly shown is fashioned, according to a further aspect of the present invention, such that each of the third frictional elements 19 set forth before is shaped, as shown in FIG. 5, so as to be faced axially only to a part of the ring-shaped frictional element 20 as viewed in a circumferential direction of each clutch housing 14. A portion of each of the third frictional elements 19 is received non-rotatably in a recess 28 in an inner surface of the transmission casing 10.

Provided that the third frictional element 19 to be supported by the transmission casing were also ring-shaped, then a brake casing which may be integral with the transmission casing 10 would be required for supporting such ring-shaped frictional element at an outer peripheral end of the element. The third frictional element 19 shown requires no brake casing and thus contributes to simplify the structure of side brake 18.

DESCRIPTION OF A PREFERRED EMBODIMENT

Figure 2:
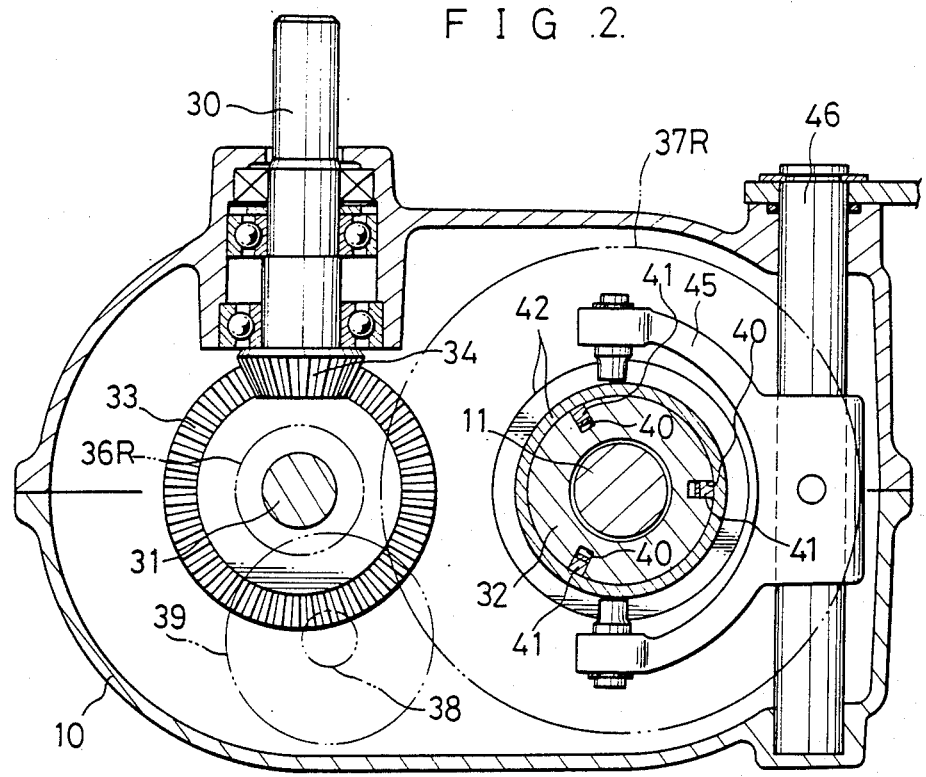
FIG. 2 is a sectional front view, partially omitted, of the transmission casing shown in FIG. 1 and somewhat enlarged in scale in comparison with FIG. 1.

The embodiment shown is employed in a transmission including a key-shift transmission mechanism, well-known from, for example, U.S. Pat. No. 4,673,055, and the whole of such transmission is shown in FIGS. 1 and 2.

The transmission casing 10 referred to before is composed of mutually fastened upper and lower halves; and it supports rotatably the upper half, a vertical input shaft 30 which extends through the top wall of casing 10. In the transmission casing are journalled a drive shaft 31, speed-change shaft 32 and the aforestated output shaft 12 and wheel axles 11 all of which extend laterally of a working vehicle (not shown). Of these shafts and axles, the drive shaft 31 and output shaft 12 are arranged generally coaxially with each other. The left and right wheel axles 11, which extend sidewards from the transmission casing 10 and have at the outer ends left and right drive wheels (not shown), are arranged coaxially with the speed-change shaft 32 which is hollow and through which one of the wheel axles 11 extends. Bearings for supporting end portions of the shafts and axles 11, 12 and 31 are received at respective halves of casing 10. The hollow speed-change shaft 32 is rotatably supported by one of the wheel axles 11.

A bevel gear 33 press-fitted on the drive shaft meshes with a smaller bevel gear 34 integrally formed in an inner end portion of the input shaft 30 and drivenly connects the drive shaft and input shaft. A key-shift transmission mechanism 35 is disposed between this drive shaft 31 and the speed-change shaft 32.

Figure 3:
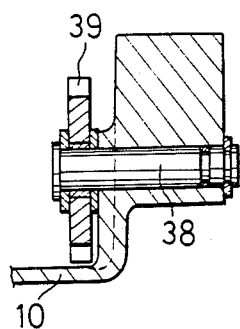
FIG. 3 is a sectional view of a part of the transmission casing shown in FIG. 1.

This transmission mechanism 35 includes forward direction first- to fifth- speed gears $36F_1$, $36F_2$, $36F_3$, $36F_4$, and $36F_5$, fixedly mounted on the drive shaft 31, and forward direction first- to fifth- speed gears $37F_1$, $37F_2$, $37F_3$, $37F_4$ and $37F_5$ rotatably mounted on the speed-change shaft 32. Corresponding two gears of these gears $36F_1$-$36F_5$ and $37F_1$-$37F_5$ are meshed respectively so as to provide five speed-change gear trains between the shafts 31 and 32. A backward direction gear 36R is fixedly mounted on the drive shaft 31 and another backward direction gear 37R is rotatably mounted on the speed-change shaft 32. These backward direction gears 36R and 37R are connected corotatably via an idler gear 39 which is rotatably mounted on a shaft 38 supported by a wall of the transmission casing 10, as shown in FIG. 3.

In the outer surface of the speed-change shaft 32 are formed three elongated axial grooves 40 within which three shift keys 41 are slidably disposed, as shown in FIGS. 1 and 2. These shift keys 41 are connected at at their base end portions to a shifter collar 42, are slidably mounted on the change shaft 32, and have, at their free ends, gear-engaging lugs 41a. These shift keys 41 are biased by leaf springs 43, which have base ends attached to the base ends of the keys 41 and free ends which engage the keys from the bottom of grooves 40, so that the gear-engaging lugs 41a project outwardly of the speed-change shaft 32. In the inner circumference of each of the gears $37F_1$-$37R$ on the speed-change shaft are formed recesses into which the gear-engaging lugs 41a may project. Between the forward direction first-speed gear $37F_1$ and backward direction gear 37R and on the speed-change shaft 32 is disposed a neutral position collar 44 having an annular groove into which the gear-engaging lugs 41a project at the neutral condition of key-shift transmission mechanism 35.

A shifter fork 45, shown in FIG. 2, engages the shifter collar 42. This fork 45 is carried by a vertically extending rotatable control shaft 46 which in turn is connected to a change lever (not shown). The key-shift transmission mechanism 35 is operated by shift mechanism; and the shifter collar 42 is moved selectively to one of the positions on the change shaft 32 where gears $37F_1$-$37R$ are coupled, one at a time, to the speed-change shaft by the gear-engaging lugs 41a of shift keys 41.

As shown in FIG. 1, a gear 48 fixedly mounted on one end portion of the speed-change shaft 32 is meshed with a larger gear 49, fixedly mounted on one end portion of the output shaft 12, so as to transmit rotation of the change shaft 32 to the output shaft with a reduced speed of rotation. The left and right side clutch gears 13 are meshed respectively with larger gears 50, fixedly mounted on inner end portions of the left and right wheel axles 11, so as to transmit rotation of the output shaft 12 to the left and right wheel axles with a reduced speed of rotation at the engaged condition of the side clutches 15.

Figure 4:
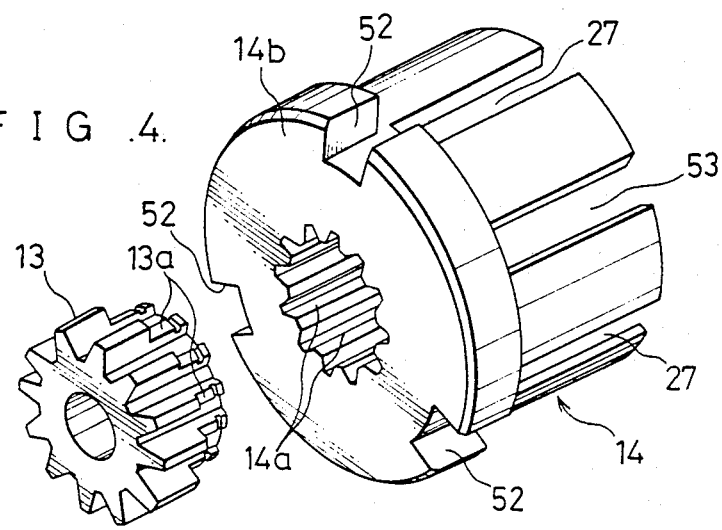
FIG. 4 is a perspective view of a side clutch gear and clutch housing shown in FIG. 1.

FIG. 4 depicts one of the side clutch gears 13 and clutch housings 14 in an exploded state. The side clutch gear 13 includes a diameter-reduced boss portion having spline teeth 13a. Corresponding spline teeth 14a are formed in the inner circumference of a center bore in a diameter-enlarged end wall 14b of the clutch housing 14. The clutch housing is secured to the side clutch gear by an engagement between the spline teeth 13a and 14a. The side clutch gear 13 and clutch housing 14 of each side are rotatably mounted on the output shaft 12 in such a way that a diameter-reduced end portion of the output shaft 12 extends through a center bore of the side clutch gear 13, as shown in FIG. 1. The clutch housing 14 is prevented from moving away by means of a snap ring 51.

As shown in FIGS. 4 to 6, three of the aforestated axially elongated thorough bores 27 are formed in the peripheral wall of each clutch housing 14 and have open ends at the opposite side of the diameter-enlarged end wall 14b. Three recesses 52 are formed in the outer circumference of end wall 14b; and they are aligned axially with the bores 27. Another three elongaged thorough bores 53 are formed in the peripheral wall of the clutch housing; and they are similar to the bores 27 and are located between each adjacent two bores 27.

As shown in FIG. 5, the first and second frictional elements 16 and 17 of each side clutch 15 are ring-shaped. Each of the first elements 16 is supported at its inner end by the output shaft 12 slidably but non-rotatably using a splined connection, whereas each of the second elements 17 is supported by having projections 17a on its outer circumference extend into the elongated axial bores 27 in the peripheral wall of the clutch housing 14 so as to be slidable but non-rotatable relative to the housing 14. Two of the aforestated third frictional elements 19 are provided to each side brake 18 and are generally shaped to have a rectangular configuration. The aforestated recess 28 for preventing rotation of such third elements 19 is formed in a vertically extending inner surface of the transmission casing 10 by integral protrusions 55 on the inner surfaces of upper and lower halves of the casing 10. Each frictional element 19 has, at both of its surfaces to it facing material 19a affixed. Only one of the aforestated fourth frictional element 20 is provided to each side brake 18, and this ring-shaped fourth element 20 is supported by having projections 20a on its inner circumference into the recesses 52 referred to before so as to be slidable but non-rotatable relative to the clutch housing 14.

As shown in FIG. 1, the frictional elements 16 and 17 of each side clutch 15 are sandwiched between a pressure ring 57 and reaction ring 58 disposed in the clutch housing 14. Of these rings 57 and 58, the pressure ring 57 is supported by the housing 14 in a fashion similar to that for the frictional elements 17. The reaction ring 58 has, at its outer circumference, three projections 58a which extend, as shown in FIG. 5, radially outwardly of the clutch housing 14 through the bores 53 referred to before so as to prevent a rotation of the ring 53 relative to the housing 14.

As shown in FIG. 6, three of the aforestated clutch control arms 21 are provided for each side clutch 15 and are supported in the fashion referred to before. The shifter sleeve 22 of each side has, in its inner circumference, three recesses 59 into which outer end portions of the clutch control arms 21 project. As shown in FIG. 1, each of the recesses 59 has an open end at an axial end surface of the shifter sleeve 22; and the second pushing portion 22b of shifter sleeve 22 referred to before is provided by the inner end wall of the recess 59.

As shown in FIGS. 1 and 6, the shifter sleeve 22 includes in its inner circumference three spring-guide grooves 60. The clutch spring means referred to before is composed of three coil springs 23 which are guided by the guide grooves 60 and also by the bores 53 in the peripheral wall of clutch housing 14. Each of these coil springs 23 is received at its base end by each of the projections 58a on the reaction ring 58 and acts upon the shifer sleeve 22 at the inner end wall of each guide groove 60.

Figure 8:
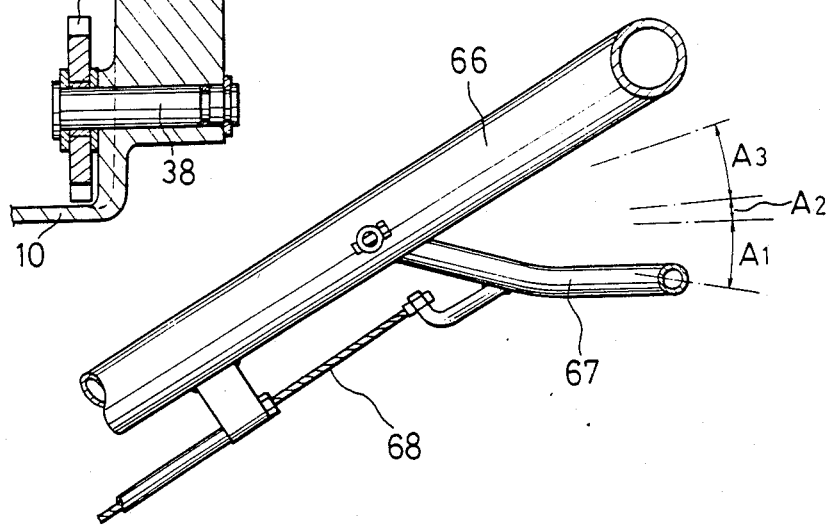
FIG. 8 is a sectional view, showing a handle bar of the vehicle in which the clutch and brake assembly shown in FIG. 1 is employed.

As also shown in FIGS. 1 and 6, the shifter sleeve 22 is formed in its outer circumference with an annular recess 22c. Two leg portions of a C-shaped shifter fork 62, which is supported rotatably by the transmission casing 10 using a pair of pins 63 and 64, project into the annular recess 22c and engage the shifter sleeve 22. One of the pins 64 projects upwardly from the transmission casing and carries an arm 65. FIG. 8 depicts one of left and right handle bars 66 of a vehicle, such as a walking mower, and one of left and right side clutch levers 67 pivotally supported by the left and right handle bars. The arm 65 shown in FIG. 6 is connected to the side clutch lever 67 shown in FIG. 8 through a control cable 68. When the side clutch lever 67 is grasped together with the handle bar 66, the control cable 68 is pulled or tensioned so as to cause a sliding movement of the shifter sleeve 22 shown in FIG. 6 against the biasing force of coil springs 23. By this, the side clutch 15 of this side becomes disengaged and then side brake 18 of the same side becomes actuated. In FIG. 8, $A_1$, $A_2$ and $A_3$ illustrate respectively first, second and third areas of rotational displacement of the side clutch lever 15 where the side clutch 15 becomes disengaged via a slipping condition (area $A_1$), the side clutch 15 is fully disengaged but the side brake 18 is not actuated (area $A_2$), and the side brake 18 becomes actuated via a slipping condition (area $A_3$). Although the operating or control mechanism for the side clutch 15 and side brake 18 of one side is shown, side clutch 15 and side brake 18 of the other side is operated or controlled, as can be understood from the foregoing descriptions, by a similar mechanism.

Figure 7:
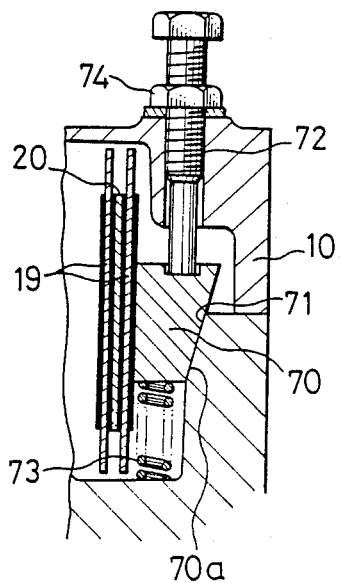
FIG. 7 is an enlarged sectional view taken generally along line VII—VII of FIG. 1.

As shown in FIG. 1, the frictional elements 19 and 20 of each side brake 18 are sandwiched between the first pushing portion 22a of shifter sleeve 22 and a reaction plate 70 disposed on an inner surface of the transmission casing 10. A suitable clearance is provided between the first pushing portion 22a and frictional elements 19, 20 for assuring that brake 18 becomes actuated only after the clutch 15 has been fully disengaged. As shown in FIG. 7, the reaction plate 70 includes at the opposite side of frictional elements 19 and 20 a tapered surface 70a which is in a slidable engagement with a corresponding tapered surface 71 on an inner wall of the transmission casing 10. An adjusting bolt 72 extending parallel with the frictional elements 19, 20 is provided against which the reaction plate 70 abuts under a biasing by a coil spring 73. The adjusting bolt 12 is threadingly engaged with a nut 74 which is fixedly secured to the upper surface of transmission casing 10. Consequently, when the bolt 72 is displaced axially by rotating it so as to displace the reaction plate 70 in the same direction, the reaction surface of the plate 70, facing the frictional elements 19 and 20, is displaced in the axial direction of side brake 18 by a cooperation of the tapered surfaces 70a and 71. By this, the timing at which the actuation of side brake 18 is initiated may be adjusted.

Figure 9:
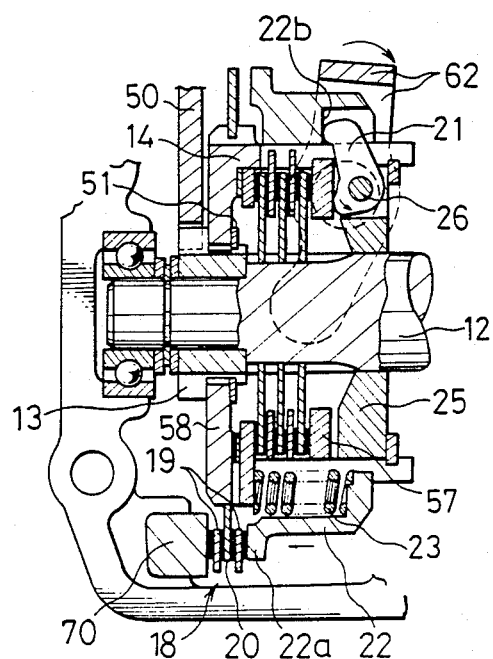
FIG. 9 is a sectional plane view of a part of the clutch and brake assembly shown in FIG. 1, showing an actuated state of a side brake employed in the assembly.

FIG. 9 illustrates the side brake 18 of one side as it appears when placed in an actuated position. The shifter fork 62 has been rotated clockwise about the pins 63 and 64 shown in FIG. 6 and, thus, the shifter sleeve 22 has been displaced towards the side brake 18 so as to pressure the frictional elements 19 and 20 between the first pushing portion 22a and reaction plate 70 and thus frictionally engage the elements 19 and 20. In such an actuated state of the side brake 18, the clutch housing 14 is kept non-rotatable relative to the transmission casing 10 so that the side clutch gear 13, corotatable with such clutch housing, is restrained from rotation whereby the wheel axle 11 of the same side is braked.

In the transmission shown in FIG. 1, the drive shaft 31 and output shaft 12 are arranged generally coaxially and the hollow change shaft 32 and left and right wheel axles 11 are arranged coaxially so the width of the transmission casing 10 in the direction across these shafts and axles is reduced substantially to that of a transmission casing in which two parallel extending shafts or a transmission shaft and coaxially arranged left and right wheel axles are journalled. The transmission shown has thus a compactness suitable for use in a small-sized vehicle. A slight deviation dH shown between the drive shaft 31 and output shaft 12 is given by offsetting the output shaft 12 inwardly of the transmission casing 10 for the purpose of eliminating a requirement that an outwardly expanded vertical wall portion is to be provided to the transmission casing for accomodating the clutch and brake assembly disposed around the output shaft.

I claim:

1. In a vehicle having a transmission casing and left and right wheel axles extending sidewards from said transmission casing, a clutch and brake assembly comprising:
   an output shaft (12) journalled in said transmission casing (10);
   axially spaced left and right side clutch gears (13) mounted rotatably on said output shaft for transmitting power from said output shaft to said left and right wheel axles;
   left and right clutch housings (14) fixedly secured to boss portions of said left and right side clutch gears and extending towards each other;
   left and right side clutches (15) disposed within said left and right clutch housings, each of said side clutches having a first frictional element 16 which is slidably but non-rotatably supported by said output shaft and a second frictional element slidably but non-rotatably supported by said clutch housing;
   left and right side brakes (18) disposed within spaces around said left and right clutch housings, each of said side brakes having a third frictional element 19 which is slidably but non-rotatably supported by said transmission casing and a fourth frictional element slidably but non-rotatably supported by said clutch housing;
   left and right clutch control arms (21) extending through peripheral walls of said left and right clutch housing, each of said clutch control arms being supported pivotally by each said clutch housing for engaging and disengaging each said side clutch;
   left and right shifter sleeves (22) slidably disposed on the outer circumferences of said left and right clutch housings, each of said shifter sleeves including axially spaced first and second pushing portions (22a, 22b), said first pushing portion (22a) of said left sleeve being adapted to actuate said left brake by a movement of said left shifter sleeve in a first direction towards the left side brake, said second pushing portion (22b) of said left sleeve being adapted to rotate said left clutch control arm so as to engage said left side clutch by a movement of said left shifter sleeve in a second, opposite direction, said first pushing portion of said right sleeve being adapted to actuate the right side brake by a movement of said right shifter sleeve in the second direction towards the right side brake, and said second pushing portion of said right sleeve being adapted to rotate said right clutch control arm so as to engage said right side clutch by a movement of said right shifter sleeve in the first direction; and
   left and right clutch spring means (23) disposed on the outer circumferences of said left and right clutch housings, each of said clutch spring means being adapted to bias said left and right shifter sleeve to move away from said left and right brake, respectively.

2. A clutch and brake assembly as set forth in claim 1 wherein a support ring (25) is fittingly disposed in each said clutch housing (14), each support ring (25) including therein a recess (25a) having open ends and extending towards said side clutch (15) and towards the inner circumference of said clutch housing and an inner portion of said clutch control arm (21) of said clutch housing being disposed in said recess and being pivotally connected to said support ring using a pin (26), an outer end portion of said clutch control arm extending outwardly through an axially elongated thorough bore (27) in the peripheral wall of said clutch housing.

3. A clutch and brake assembly as set forth in claim 2, wherein each of said support rings (25) is disposed around said output shaft (12).

4. A clutch and brake assembly as set forth in claim 1, wherein each of said fourth frictional elements (20) is ring-shaped whereas each of said third frictional elements (19) is shaped such that said third frictional element is faced axially only to a part of said fourth frictional element with respect to a circumferential direction of each said clutch housing (14), a portion of said third frictional element being non-rotatably disposed in a recess (28) in an inner surface of said transmission casing (10).

* * * * *